United States Patent [19]

Hove

[11] Patent Number: 5,356,249
[45] Date of Patent: Oct. 18, 1994

[54] AUTOMATIC SECURING SYSTEM FOR LOCKING AND UNLOCKING A FREIGHT CONTAINER TO A LOAD CARRIER

[75] Inventor: Johan Hove, Jacksonville, Fla.

[73] Assignee: Buffers AB, Taby, Sweden

[21] Appl. No.: 40,027

[22] Filed: Mar. 30, 1993

[51] Int. Cl.⁵ .................. B61D 17/00; B61D 45/00; B60P 7/00; B60P 3/00
[52] U.S. Cl. ...................................... 410/83; 410/82; 410/70
[58] Field of Search .................. 410/69, 70, 74, 75, 410/76, 82, 83, 90, 91, 134, 137; 24/265 CD, 115 K, 68 CD; 248/499, 503

[56] References Cited

U.S. PATENT DOCUMENTS

| | | | |
|---|---|---|---|
| 3,111,341 | 11/1963 | Fujioka et al. | 410/82 |
| 3,370,550 | 2/1968 | Gutridge et al. | 410/82 X |
| 3,618,999 | 11/1971 | Hlinsky | 410/83 X |
| 3,924,544 | 12/1975 | Grau et al. | 410/83 X |
| 4,013,017 | 3/1977 | Toyota et al. | 410/83 X |
| 4,092,040 | 5/1978 | Tatina | 410/83 |
| 4,776,736 | 10/1988 | Tatina | 410/83 |

Primary Examiner—Michael S. Huppert
Assistant Examiner—Stephen Gordon
Attorney, Agent, or Firm—Browdy and Neimark

[57] ABSTRACT

This invention is directed to an automatic securing system for locking and unlocking an ISO container or the like to a load carrier. The securing system comprises a pair of rails fixed on the load carrier which includes a number of twistlock devices releaseably fixed at selected positions on the rails to automatically lock the container down on the load carrier. The system also includes a release mechanism on the rails that automatically and simultaneously unlocks and releases the engaged twistlocks from the container and the rails. The release mechanism also allows unlocked and released twistlocks to be moved and fixed to different seating positions on the rails to permit automatic locking down of containers with different lengths.

6 Claims, 8 Drawing Sheets

FIG. 13
FIG. 14
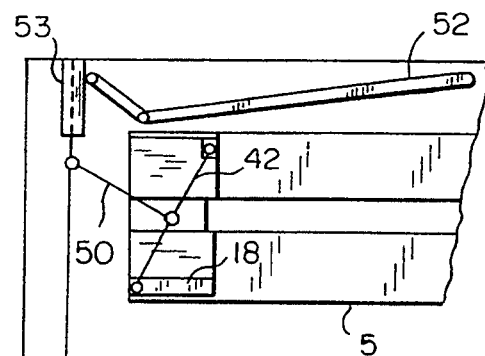
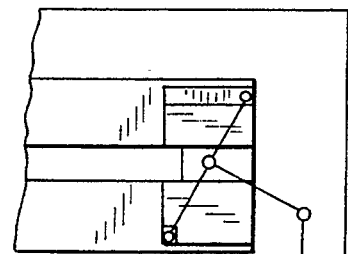
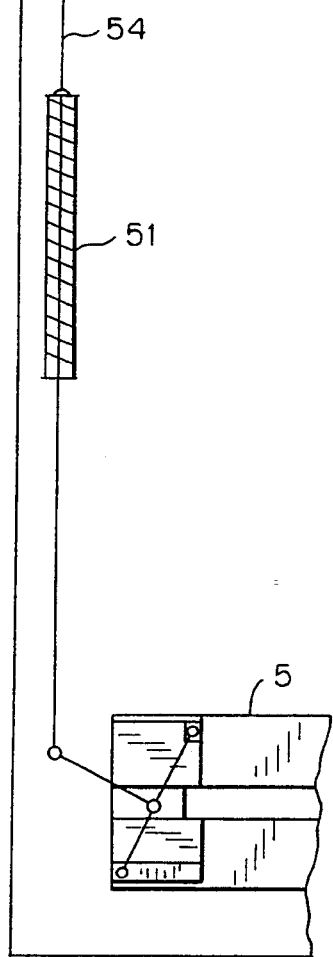
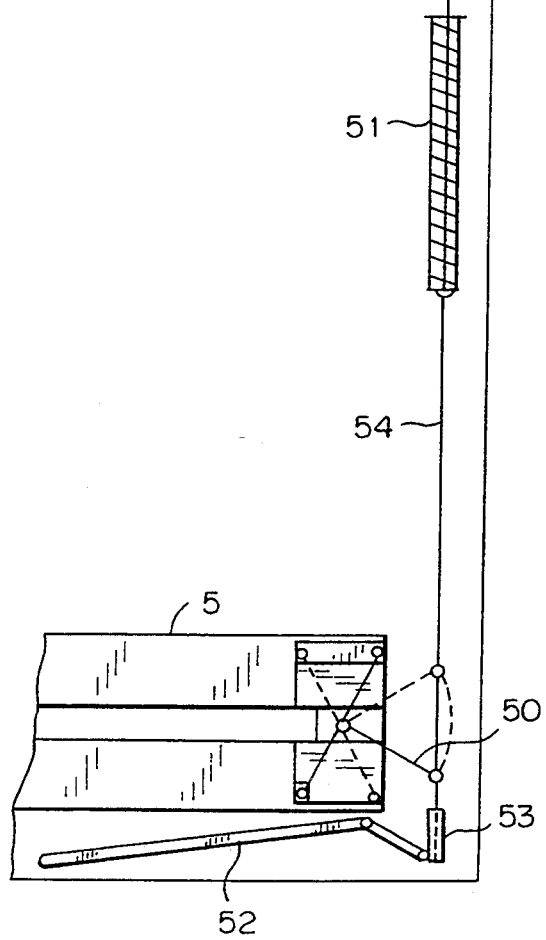

AUTOMATIC SECURING SYSTEM FOR LOCKING AND UNLOCKING A FREIGHT CONTAINER TO A LOAD CARRIER

FIELD OF THE INVENTION

The present invention relates to an automatic securing system for locking and unlocking freight or cargo containers to load carriers. The system provides a high degree of safety with automatic and positive locking of the container to the load carrier during transport through the use of a plurality of twistlocks. The system also includes a time saving opening means permitting the manual opening of all the twistlocks securing the load carrier to the container by actuating a single lever.

BACKGROUND OF THE INVENTION

The locking and securing of freight containers, equipped with the hollow International Standard Organization (ISO) bottom corner castings or their equivalent, to load carriers such as a truck chassis or rail car, has been pursued in different ways for more than 30 years.

Over the years, different types securing devices for maintaining freight containers on load carriers have been developed. Depending on the circumstances of the security required, three main categories of locks have been developed:

A. Positioning locks which do not provide vertical hold down of the container on the carrier. Such locks are inexpensive in both manufacture and usage. They are commonly used on rail cars in Europe. Until recently, the disadvantage of not having vertical hold down on the positioning locks used on rail cars has been acceptable because such locks do not require labor for locking or unlocking. However, European railroads are reconsidering use of such locks because empty freight containers without vertical hold down have been blown off carrier cars when passing over high bridges during exposure to sidewinds.

B. Positive locking securing devices, which provide vertical hold down of the container on the load carrier up to a certain force. This type of lock permits, the lock to disengage if a predetermined lifting force is exceeded. This type of lock is commonly used on rail cars in the USA and Canada as it is inexpensive to operate and provides reasonable securing safety.

C. Positive locking securing devices which provide vertical hold down of the container on the carrier unless unlocked or broken. Such locks are commonly designed as a stem with a rectangular upward pointed head. After loading the container over the pointed head, the container is locked to the carrier by manually twisting the stem about 90 degrees, hence the name twistlock. Twistlocks are normally used on a truck chassis in three different designs: non-retractable, retractable (below the horizontal load line) and screw down (the head and the stem can be tightened down to eliminate play between head and corner casting during transportation).

A large variety of such twistlocks have been designed. This type of lock is more time consuming to handle since they all have to be individually and manually operated. The obvious advantage is however that the lock offers a high level of locking safety as it will only release if it is pulled to a break point. Further since they normally are used on a truck chassis rather than a rail car, the truck driver is always available to operate the locks on his truck, so manually operated twistlocks that offer positive locking, do not present costly labor costs.

Notwithstanding, the availability of the above identified locking devices, operating positively locking twistlocks on rail cars has been proven to be very labor intensive. For instance British Railways has fitted 24 regular truck chassis twistlocks to its rail cars to better secure cargo containers. However, the amount of time required to unfasten these twistlocks is viewed as a major disadvantage.

Because of the time consumed in removing a cargo container from the rail cars in the type of system used by the British, other railroads have been looking for a less complicated system. In Europe, the need for a less time consuming securing system with positive locking is driven not only by adverse experience with position locks but by the number of different types of containers in use. These include the standard ISO 20', 30' and 40' containers as well as European Swap Bodies, with locking points at 20' but gross length of the containers being, for example, 23.6 feet, or 25.7 feet long. The number of different length containers greatly increases the number of different load configurations that the securing system on the load carrier must be capable of handling. For example—a 60' rail car must have 22 pairs of twistlocks in pre-set positions, in order to accommodate all possible load patterns. The locks also must be retractable, so that the right number of locks in the right positions to suit a certain load configuration, are exposed. It is also desirable to permit longitudinal movement of the locks along the rail car to reduce the number of locks needed.

SUMMARY AND OBJECTIVES OF THE INVENTION

The present invention is directed to accommodating the above identified need for positive vertical hold down and easy locking and unlocking of all engaged twistlocks, during the use of different length containers on the same load carrier. The securing system according to the invention, facilitates easy loading of cargo containers since the locks automatically lock by lowering the container with a corner casting onto the lock. All engaged twistlocks of the system according to the invention are linked together to permit simultaneous opening by one man moving a lever from either side of the rail car. Locks that are not necessary in a particular load configuration can be manually moved and retracted to be unintrusive. Each twistlock is springbiased to a closed position and is forced no twist to an open position when a container is lowered onto the locks. Once the head of the twistlock is fully inserted through a slot in the hollow corner casting of the container the head is spring returned to its closed position.

The invention permits maximum flexibility in loading different length freight containers on the load carrier by providing a plurality of seating positions in which twistlocks to be engaged to the container can be fastened to permit different container configurations. The system according to the invention also provides means to manually move twistlocks unnecessary in a selected container configuration into a retracted position. Even with some twistlocks retracted in a selected configuration, the engaged twistlocks of the system still provide a minimum 2 g in longitudinal impact strength. The positive locking twistlocks of the invention do not automatically disengage when the container is lifted as in prior art devices. The locks will positively lock and hold down the container under all normal and extreme transportation conditions and will therefore not disengage from a locked position unless the lifting force exceeds the designed tensile strength of the twistlock.

BRIEF DESCRIPTION OF THE DRAWINGS

FIG. 13 shows the details of the turning handle to actuate the twist lever shown at one end of the rail car of FIG. 1, FIG. 14 shows the details of the turning handle to actuate the twist lever at an end of the rail car of FIG. 1 opposite to to that of FIG. 13.

DETAILED DESCRIPTION OF THE PREFERRED EMBODIMENT

Figure 1:
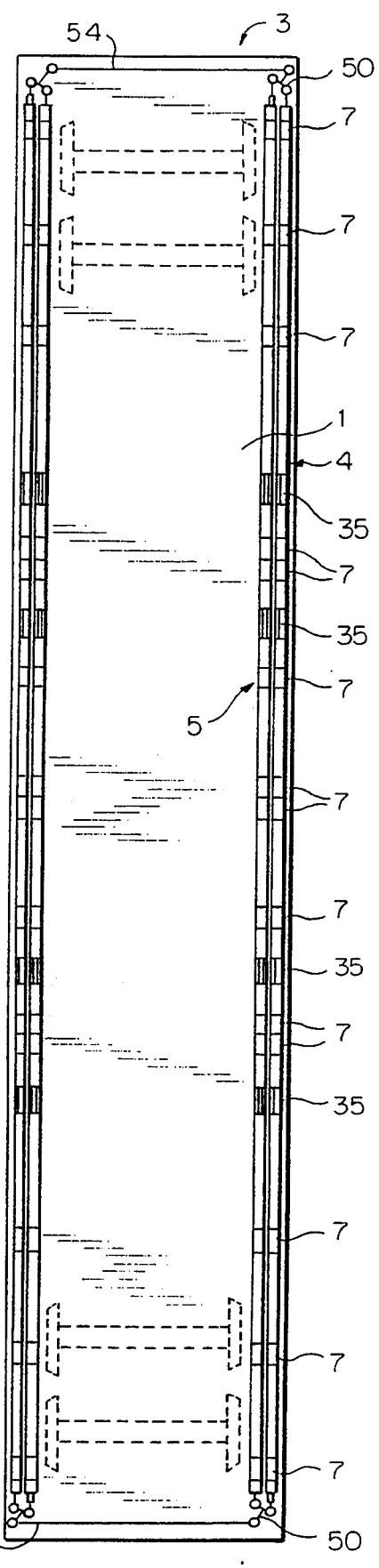
FIG. 1 is a plan schematic view of a top surface of a load carrier with a pair of rails for use with twistlocks according to the invention for engagement to a freight or cargo container.

The automatic securing system for locking and unlocking a freight or cargo container(s) to a load carrier includes a pair of rails 4 fixed to the load surface 1 of a load carrier 3 parallel to the longitudinal axis of the load carrier 3, as shown in FIG. 1. The rails are spaced from each other in a manner allowing a plurality of twistlocks 6 (not shown in FIG. 1) to be moved on rails 4 for automatic engagement to the interior of ISO corner castings fixed to the bottom of a freight or cargo container(s) so as to secure the container to the load carrier. It is intended that there be enough twistlocks 6 engaged on rails 4 to enable more than one freight or cargo container to be secured to the load carrier which may be for example 60 feet in length. For example, six twistlocks 6 as further described below, can be moved along each rail 4 into engagement with any of fourteen seating positions 7 on a rail 4 to correspond with corner castings of the selected number of containers to be secured to load carrier 3.

Further, storage areas 35 are provided on rails 4 to retain unused twistlocks 6 in a retracted position when the number of cargo containers used makes some twistlocks on rail 4 unnecessary.

Figure 2:
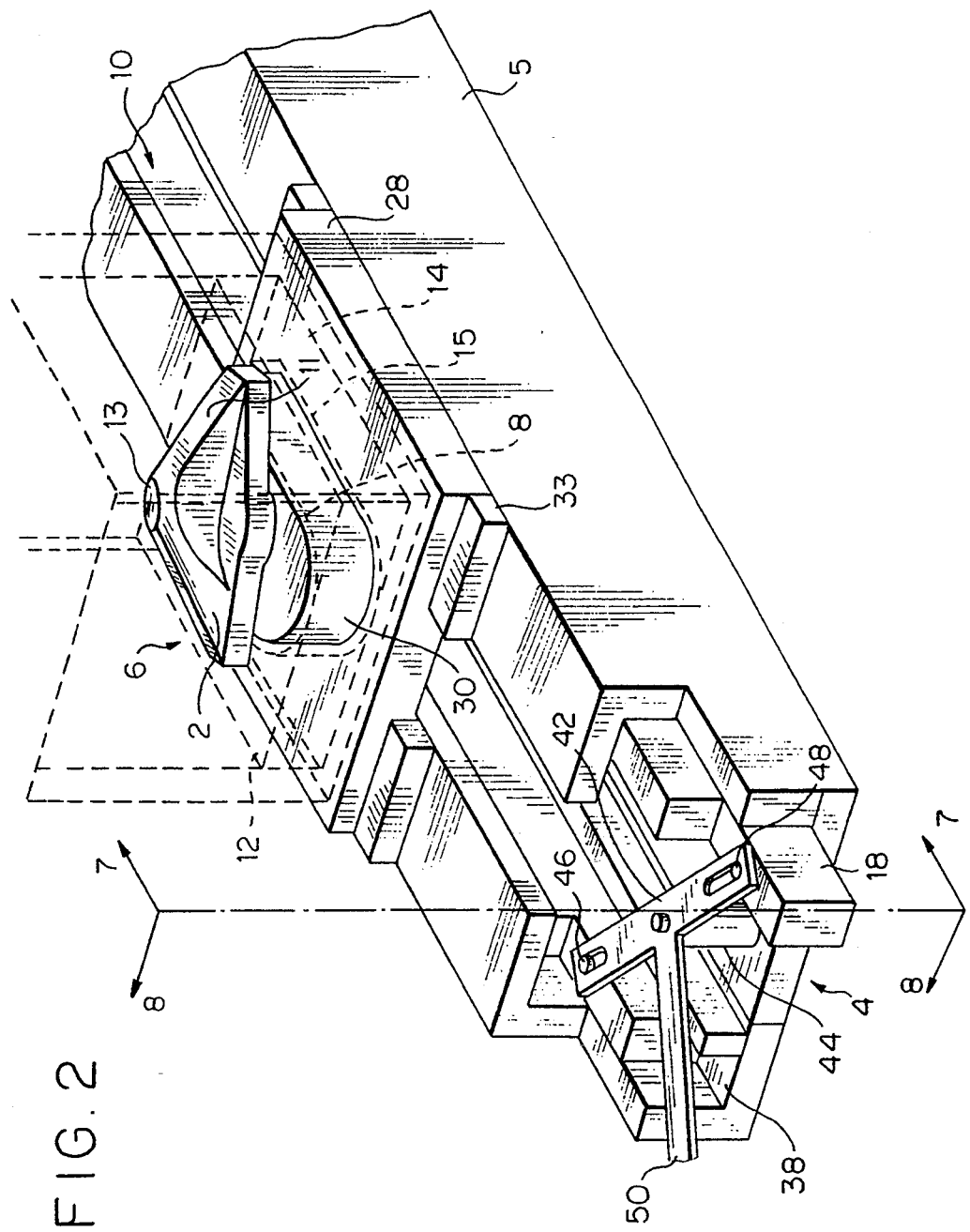
FIG. 2 is a partial perspective view of a twistlock according to the invention engaged in an ISO corner casting in a seating position on one of the pair of rails shown in FIG. 1.

Engagement of one of the plurality of twistlocks 6 as it is engaged in a seating position 7 in a locked position to a ISO corner casting is shown in FIG. 2. It is understood that other twistlocks 6 are engaged in other of the fourteen seating positions 7 shown in FIG. 1 in order to engage a selected number of containers to the pair of rails 4. The upper twistlock head 2 of the twistlock 6 in FIG. 2 is shown fitted through a locking slot 8 of an ISO corner casting 10, shown in phantom lines, in a locked position to an inner surface 12 of corner casting 10.

Figure 7:
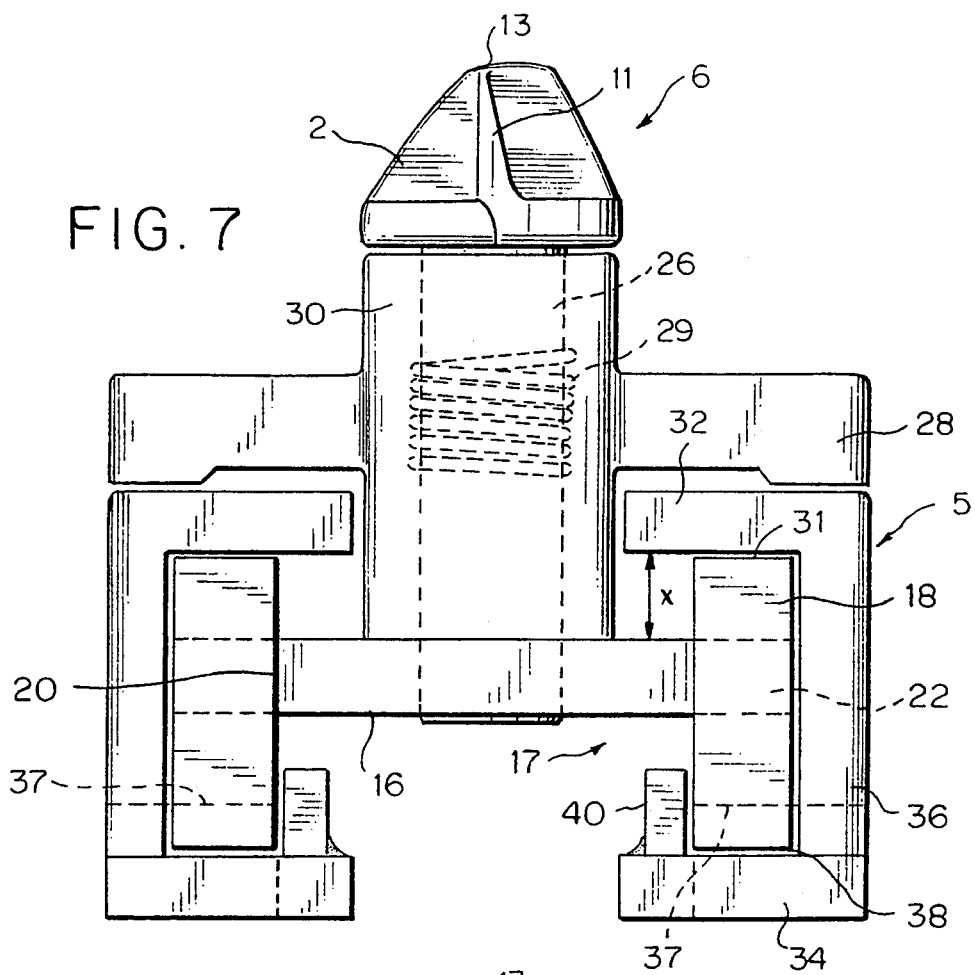
FIG. 7 is an elevation view of the twistlock and rail shown in FIG. 2 along section 7—7 with the twistlock in an unlocked position.
Figure 8:
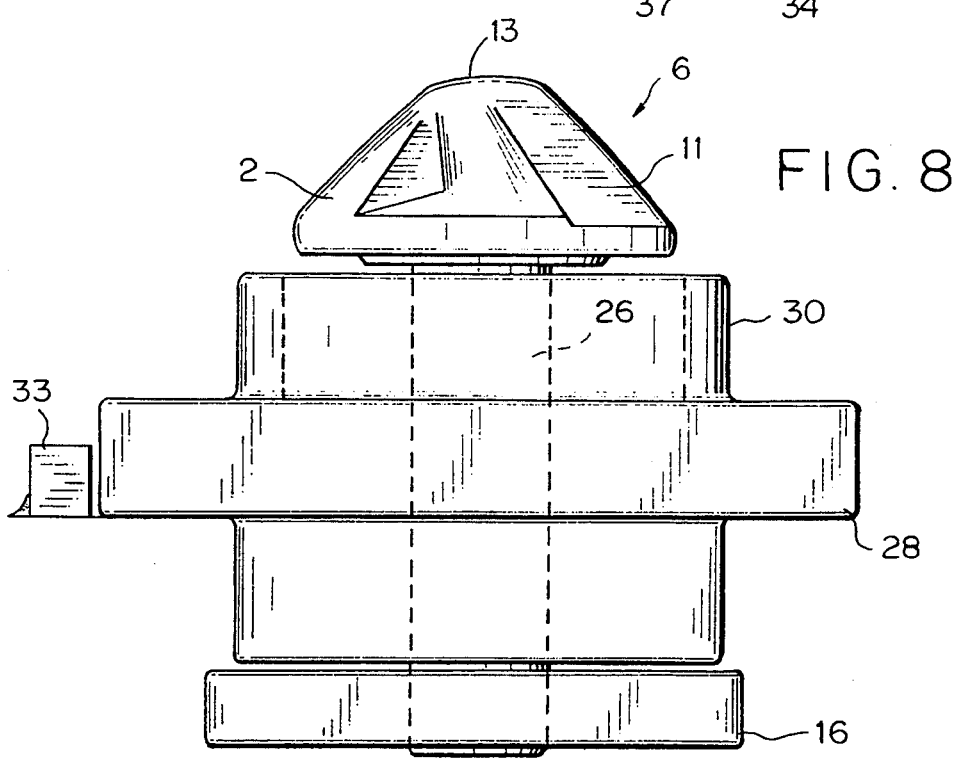
FIG. 8 is a partial longitudinal elevation view of the twistlock and rail shown in FIG. 2 along section 8—8.

As shown in FIG. 7, each one of the pair of rails 4 comprises two twistlock beams 5 each having an upper flange 32 and a lower flange 34, both being integrally joined to vertical wall 36 to form a U-shaped cross-section with an opening 17 facing the opening 17 of the other beam 5.

Figures 3, 4:
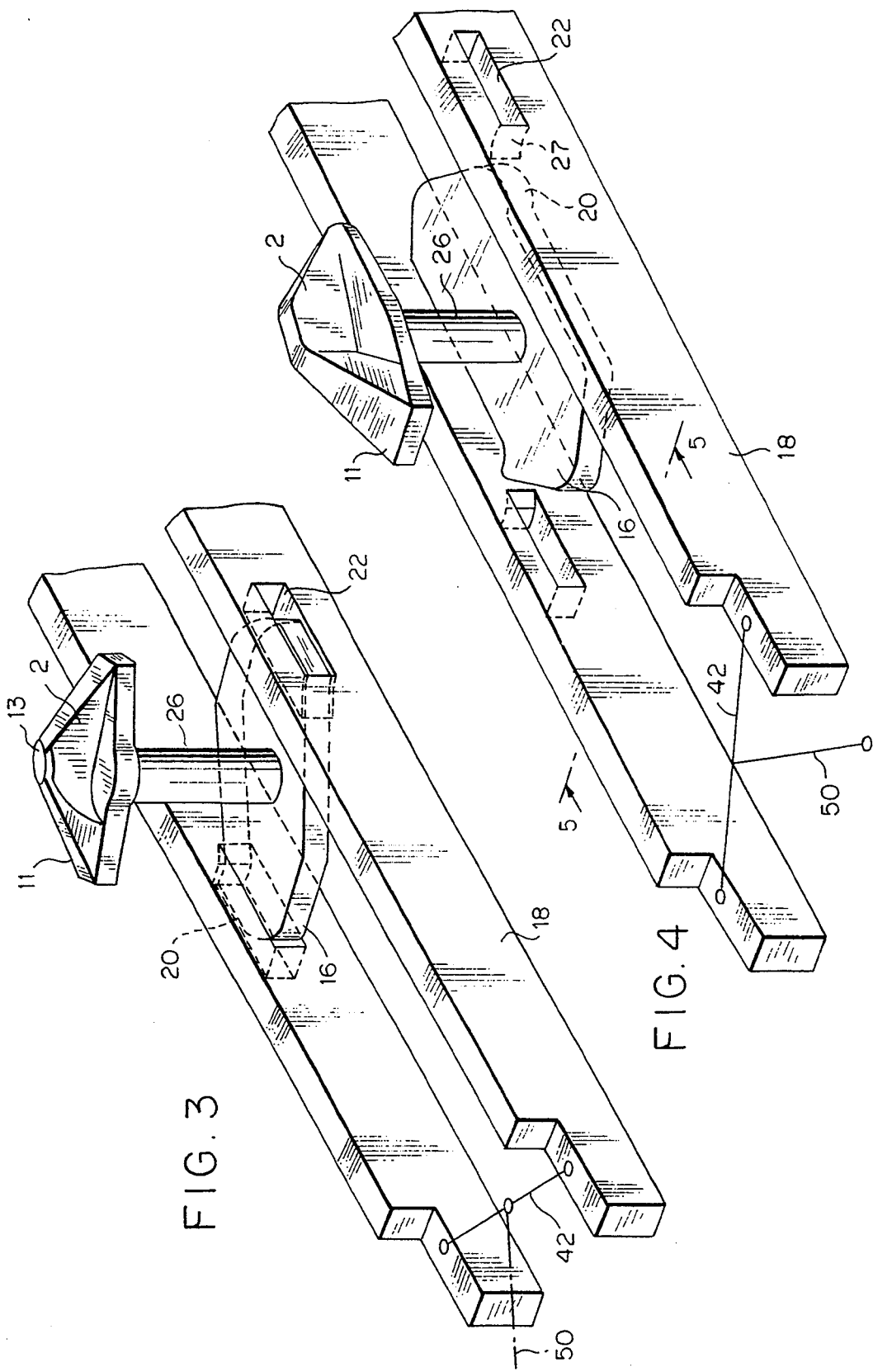
FIG. 3 is a partial perspective view showing only a portion of the twistlock and the unlocking bars of FIG. 2 with the twistlock in a locked position as in a seating position of FIG. 2.
FIG. 4 is a partial perspective view showing only a portion of the twistlock and the unlocking bars of FIG. 2 with the twistlock in an unlocked position as in a seating position of FIG. 1.

As further shown in FIG. 7 upper twistlock head 2 and lower twistlock head 16 are integrally joined by shaft 26 so that head 2 and 16 each rotate through the same angle when shaft 26 is turned in twistlock pad 28. Twistlock pad 28, which serves as the loading surface for the freight container when twistlock 6 is engaged to a container ISO corner casting is restrained from rotating or moving longitudinally in seating position 7 by twistlock stops 33. Shaft 26 is rotatable in twistlock pad 28 and is engaged to twistlock pad 28 at one end of a spring 29 which has its other end engaged to pad 28. As shown in FIGS. 3 and 4 lower twistlock head 16 and upper twistlock head 2 are respectively held by spring 29 in a locked position in slots 22 of unlocking bars 18 and in engagement with inner surface 12 of a corner casting 10 when a container is engaged on load carrier 3. It is understood that the lower twistlock head 16 of each twistlock 6 in a seating position 7 is engaged in slots 22 when the twistlocks are in a locked position ready to receive a container for loading.

As shown in the Figures, upper twistlock head 2 has a pair of ridges 11 which slope downward from top 13 of head 2. Sloping ridges 11 can slideably engage longitudinal edges 15 of locking slot 8 of casting 10 when a container is lowered into engagement with the load carrier and in the lowering process casting 10 engages a corresponding twistlock 6 in locked position (See FIG. 2). As the container continues to be lowered, edges 15 slide down ridges 11 and upper twistlock head 2 rotates against spring 29 until upper twistlock head 2 passes through locking slot 8 and spring 29 returns head 2 to a locked position as shown FIG. 2.

FIG. 7 also shows a shear block 30 having a thickness substantially equal to the thickness of the bottom wall 14 of corner casting 10 which ultimately engages against pad 28. Shear block 30 is integrally formed on twistlock pad 28. Shear block 30 assures that upper twistlock head 2 is able to rotate over bottom wall 14 into engagement with inner surface 12 on bottom wall 14 after upper twistlock head 2 passes through locking slot 8 of casting 10.

FIG. 7 further shows a twistlock 6 with its upper twistlock head 2 and its lower twistlock 16 in an unlocked position relative respectively to an ISO corner casting (not shown in FIG. 7) and unlocking bars 18. FIG. 3 shows that lower twistlock head 16 has two arced abutment edges 20 which are engaged in slots 22 of unlocking bars 18 when twistlock 6 is a locked position. When twistlock 6 is actuated to an unlocked position as in FIG. 7, edges 20 ride along led sides 27 of slots 22 onto the surface of unlocking bars 18 as shown in FIG. 4.

Figure 12:
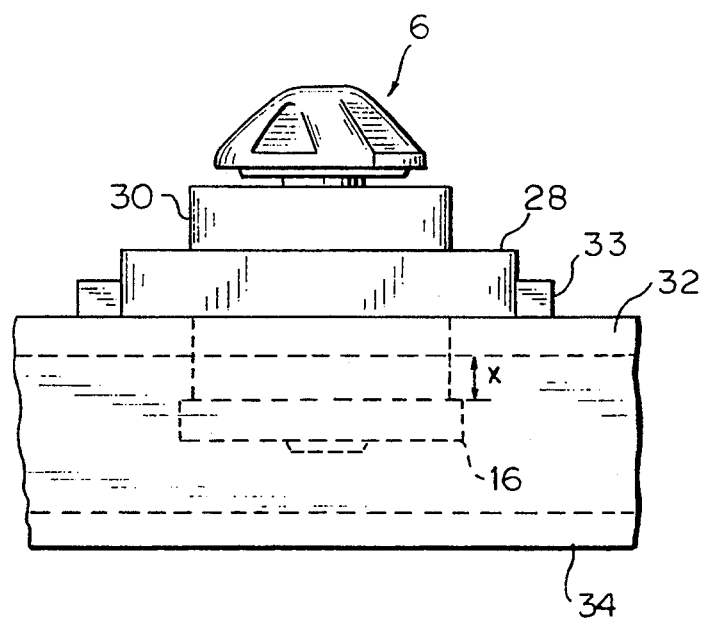
FIG. 12 is an elevation view of a twistlock according to the invention in a seating position shown on FIG. 1.

FIG. 7 also shows that lower twistlock head 16 is located a space "x" away from the bottom surface 31 on flange 32 of beams 5 when twistlock 6 is seated within one of the fourteen seating positions 7. Space "x" is higher than the height of twistlock stops 33, shown in FIGS. 2 and 12. As noted, stops 33 form the longitudinal limits of each of the fourteen seating positions 7 on rail 4 shown on FIG. 1. Twistlock stops 33 serve to both position the twistlocks 6 in the longitudinal direction on rails 4 and prevent rotation of twistlock pads 28 when the twistlocks 6 are being engaged to a freight container.

Space "x" between lower twistlock he 16 is provided to permit a twistlock 6 when in an unlocked ion as shown in FIG. 7 and disengaged from unlocking bars 18 shown in FIG. 4, to be manually lifted over twistlock stops 33. This permits such a twistlock 6 to be thereafter moved longitudinally to either a new seating position 7 on rails 4 or to a retracted position in slot 35 in rail 4 as shown in FIG. 11.

Figure 11:
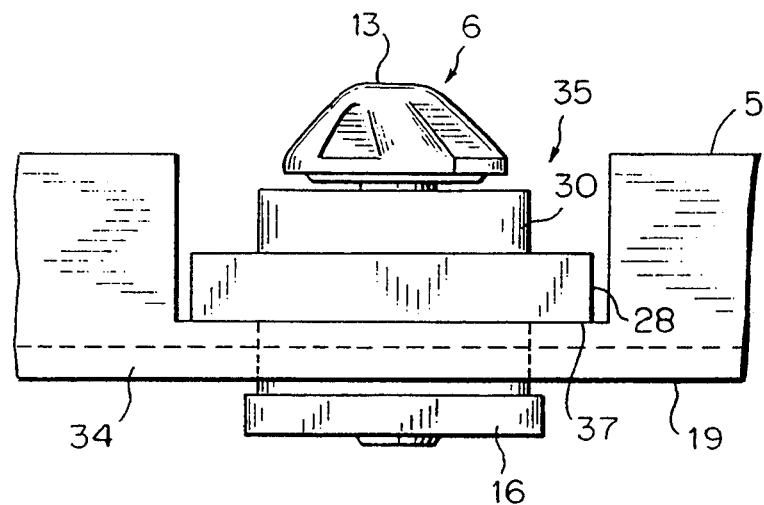
FIG. 11 is a twistlock according to the invention in the slot opening of FIG. 6 in retracted position.

FIG. 11 shows a twistlock 6 after being moved from a seating position 7 into a retracted position in slot 35. Slot 35 is formed with ledges 37 in beams 5 to provide a seating base for twistlock pad 28 when twistlock 6 is retracted within slot 35. Ledges 37 are formed at a distance below the flange 32 of beams 5 to assure location of lower twistlock head 16 below the bottom surface 19 of beams 5 as shown in FIG. 11. In this position the top 13 of the retracted twistlock 6 is located below the bottom side of any container secured to the load carrier by twistlocks operating in seating positions 7 of rails 4. Slot 35 can be further constructed so lower flanges 34 of beams 5 extend toward each other far enough to limit upward movement of the lower twistlock head 16 of a retracted twistlock 6. As can be seen from the figures the width of lower twistlock head 16 whether in locked or unlocked position precludes removal of a twistlock 6 from rail 4 until it reaches lot 35 where the flanges 32 of beams 5, which otherwise limit upward movement of an unlocked twistlock, have been eliminated.

Figure 5:
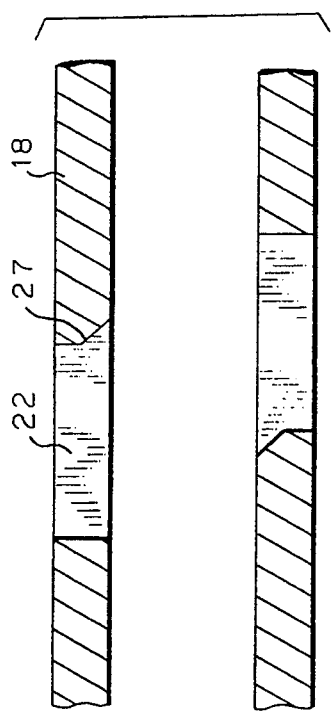
FIG. 5 is a plan view of the unlocking ban along section 5—5 of FIG. 4.
Figure 6:
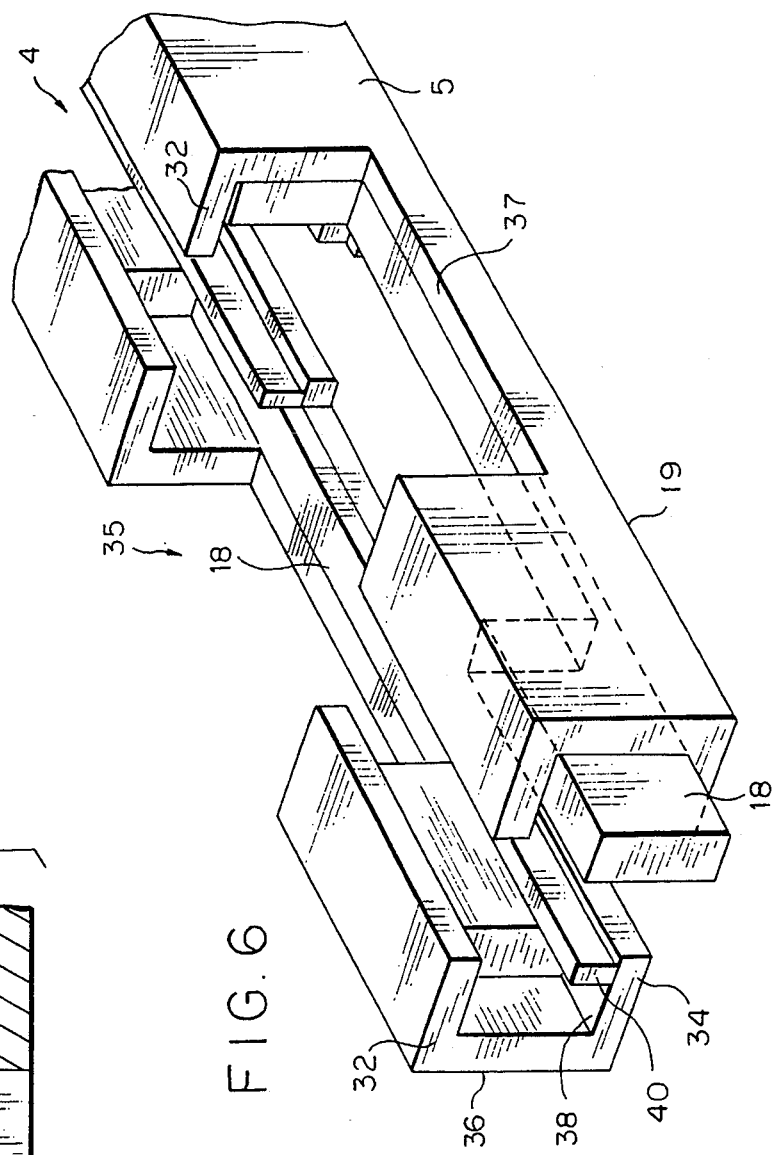
FIG. 6 is a partial perspective view showing the detail of a slot opening in the rail shown in FIG. 1 for storage of a twistlock when in a retracted position.

As shown in FIGS. 2, 5 and 7 unlocking bars 18 are slideably engaged within beams 5 in longitudinal grooves 38 formed by lower flange 34 and wall 36 of beam 5 and flange 40. Grooves 38 may be lined with any conventional material to eliminate friction when unlocking bars 18 are moved in grooves 38. A sliding of unlocking bars 18 in grooves 38 to lock or unlock twistlocks 6 as respectively shown in FIGS. 3 and 4 is actuated by unlocking lever 50. As shown in FIGS. 1 and in greater detail in FIG. 2, unlocking lever 50 is integrally joined to twist lever 42, which is rotatably mounted on shaft 44. Twist lever 42 is engaged to unlocking bars 18 by slots 46 through which pins 48 on unlocking bars 18 are slideably engaged. When unlocking lever 50 is rotated unlocking bars 18 are slid in beams 5 to either; 1) engage lower twistlock head 16 in slots 22 and set upper twistlock head 2 into a locking position, as shown in FIG. 3, or, 2) disengage lower twistlock head 16 out of slots 22 by rotating arced abutment edges 20 out of slots 22 along angled sides 27 onto the surface of unlocking bars 18 and thereby set upper twistlock head 2 into an unlocked position, as shown in FIG. 4. As shown, the distance unlocking bars 18 can slide is limited by the length of slots 46 which are designed to end the slide of unlocking bars 18 with head 2 in either a locked or unlocked position. Further, when it is desirable to move the lower twistlock head 16 from the unlocked position, shown in FIG. 4, to the locked position of FIG. 3, rotation of twist lever 50 will result in spring 29 rotatably urging inner twistlock head 16 into slots 22.

As shown in FIGS. 1 and 2 each rail 4 is provided at each adjacent end with an unlocking lever 50. As is shown in greater detail in FIGS. 13 and 14, each pair of adjacent unlocking levers 50 are pivotally engaged to a turning handle 52 at opposite ends of rail car 3. FIGS. 13 and 14 respectively show the location of turning handle 52 at either opposite ends of rail car 3. Each turning handle 52 can unlock all twistlocks 6 in seating positions 7 on both rails 4 simultaneously. As seen in FIGS. 1, 13 and 14, the two turning handles 5 are positioned at diagonally spaced end corners of the load carrier to facilitate easy unlocking of the engaged twistlocks 6 from opposite side ends of the load carrier. Each turning handle 52 is associated with a return spring 51 which functions to return handle 52 to a closed position from an open position as shown by the dashed lines in FIG. 14. FIGS. 13 and 14 also show a push tube 53 pivotably engaged to each turning handle 52 engaged on a link arm 54. When either handle 52 is rotated open it transmits the turning force to corresponding lever 50 by push tube 53 pushing on the corresponding end of link arm 54. When opening either handle 52, the handle 52 on the opposite end of rail car 3 remains unopened as corresponding link arm 54 slides out of engagement with slide tube 53. Thus, when the handle 52 in FIG. 14 is opened the handle 52 in FIG. 13 remains closed.

Figure 9:
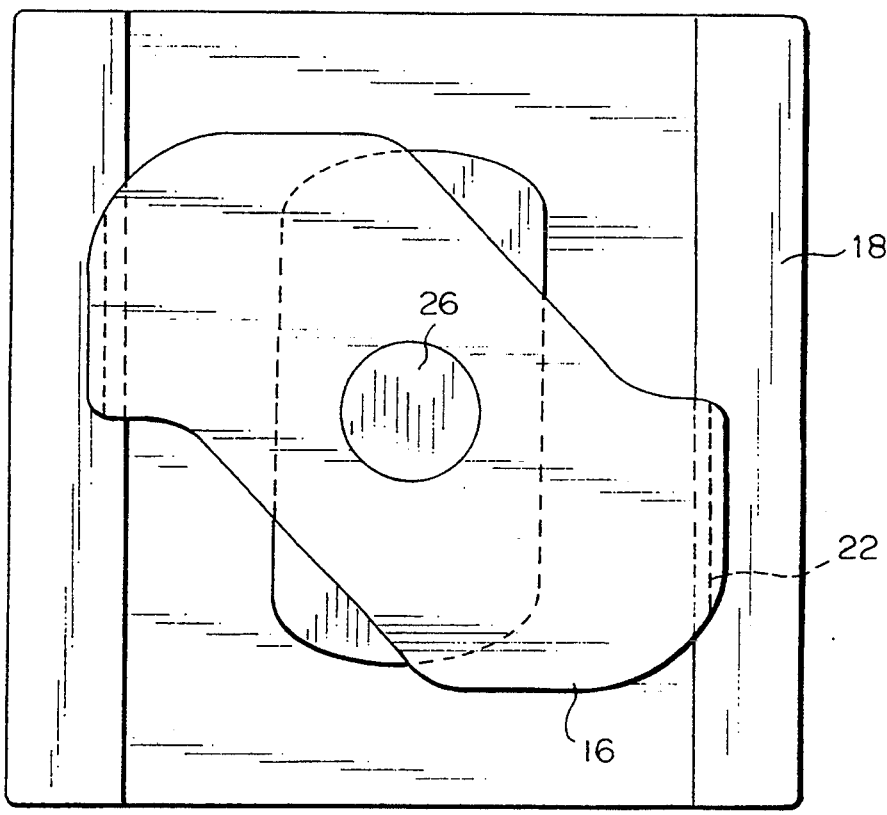
FIG. 9 is a bottom plan view of the bottom twistlock head engaged to the unlocking bars shown in FIG. 2.
Figure 10:
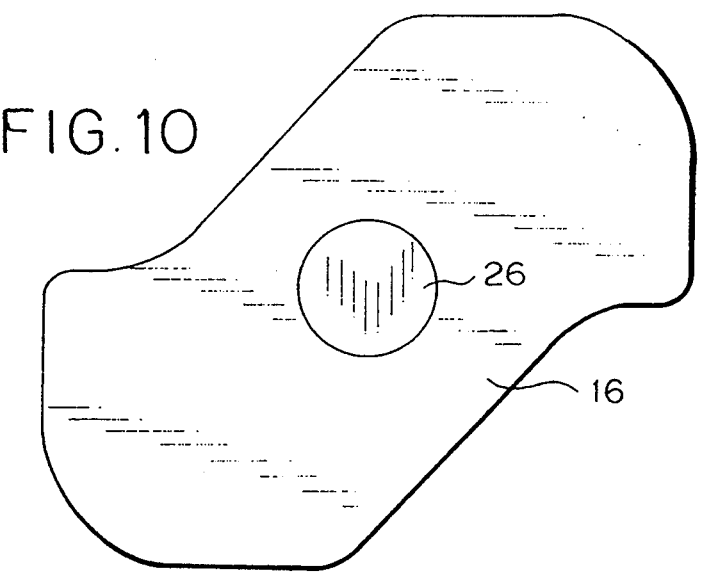
FIG. 10 is a top plan view of the bottom twistlock head according to the invention.

As noted, a selected number of twistlocks 6 sufficient to engage a number of standard length cargo containers within the length of the load carrier can be engaged on seating positions 7 on each rail 4. To permit the unlocking of each and every twistlock 6 wherever positioned on seating positions 7 on each rail 4, unlocking bars 18 are provided with slots 22 corresponding to each seating position 7 on each rail at locations relative to lower twistlock head 16 as shown in FIGS. 3, 4 and 9. In this regard, it is emphasized that the twistlock 6 shown in FIGS. 3, 4 and 9 is intended to show the position of lower twistlock head 16 relative to unlocking pars 18 it would occupy when a twistlock 6 is placed in any one of the fourteen seating positions 7 shown in FIG. 1 in either a locked or unlocked position.

The automatic securing system for locking and unlocking a freight or cargo container to a load carrier in accordance with the invention is best operated as follows. When a container having ISO corner castings or the equivalent is ready for engagement with the load carrier, the number of twistlocks corresponding to the number of corner castings on the container or containers to be secured are positioned in seating positions 7 corresponding to the positions of the corner castings on rails 4. The twistlocks are seated within seating positions 7 with upper twistlock heads 2 in a closed position with lower twistlock head 16 engaged in slots 22. Unnecessary twistlocks 6 are manually moved to a retracted position in slots 35.

Thereafter, the container or containers are lowered so that slot 8 of each casting 10 is in engagement with each upper twistlock head 2. As the container continues to be lowered, slot 8 of each casting 10 begins to rotate each upper twistlock head 2 until head 2 passes through slot 8 and spring 29 returns head 2 into a locked position over bottom wall 14 of each casting 10 as shown in FIG. 2.

To thereafter unload a container off of load carrier 3, either of handles 52 are rotated to move unlocking bars 18 into the position shown in FIG. 4 to enable upwards lifting of the container, while upper twistlock head 2 is in an unlocked position. After all containers are removed from the load carrier, handle 52 is released and spring automatically returns handle 52 to its closed position thereby resetting each twistlock 6 as shown in FIG. 3 ready for the loading of the next container.

What is claimed:

1. An automatic securing system for locking and unlocking a container to a load carrier, said securing system comprising:
   a plurality of rails fixed on said load carrier,
   a plurality of twistlock means releaseably engaged to said rails for automatically engaging and locking said container down on said load carrier,
   said plurality of twistlock means having spring means for actuating each said plurality of twistlock means to automatically engage and lock said container down on said load carrier,
   each of said plurality of rails having a plurality of seating position means for respectively engaging said plurality of twistlock means to said plurality of rails,
   release means on said rails for automatically and simultaneously unlocking and releasing said plurality of releaseably engaged twistlock means respectively from said container and said rails,
   wherein, said release means allows said unlocked and released plurality of twistlock means to be individually moved into engagement with different said seating position means to permit automatic engaging and locking down of containers with different lengths on said load carrier.

2. The securing system according to claim 1, wherein each of said twistlock means comprises:
   an upper twistlock head having ridges sloping down from a top surface,
   a lower twistlock head,
   said upper twistlock head integrally fixed to said lower twistlock head by a shaft fixed therebetween,
   said shaft being rotatably engaged in a twistlock pad by said spring means,
   said twistlock pad and said lower twistlock head means being releaseably engaged in any one of said seating position means,
   wherein, a slot of a corner casting on said container rotates said top surface against said spring until said upper twistlock head passes through said slot and is returned over a bottom wall of said corner casting to a locked position as said container is lowered onto said load carrier.

3. The securing system according to claim 2, wherein said release means comprises,
   a pair of unlocking bars slideably engaged along a longitudinal length of each of said plurality of rails,
   each of said pair of unlocking bars having a slot within each of said plurality of seating position means,
   each said lower twistlock head having two edges respectively engageable with each said unlocking bar slot,
   lever means engaged to said each of said pair of unlocking bars at each end of said plurality of rails for sliding said each of said pair of unlocking bars so that each said unlocking bar slot engages said each of said two edges to set each said upper twistlock head in said locked position or to disengage said each of said two edges from said each said unlocking bar slot to set each said upper twistlock head in an unlocked position.

4. The securing system according to claim 3, wherein each of said plurality of rails comprises:
   two channels each having a U-shaped cross-section formed by an upper flange and a lower flange joined to opposite ends of a side wall,
   said two channels facing each other such that an opening is formed between the respective upper and lower flanges of said two channels,
   wherein each of said pair of unlocking bars is respectively slideably engaged and retained in said opening against a respective one of said side walls by a projecting member fixed to each said lower flange and extending into said opening.

5. The securing system according to claim 4, wherein each of said plurality of rails further comprises:
   storage areas to retain unused twistlock means of said plurality of twistlock means in a retracted position,
   said storage means formed by removal at selected intervals along each of said plurality of rails, of each of said upper flanges, an upper portion of each said side wall and an upper portion of each of said pair of unlocking bars.

6. The securing system according to claim 5,
   wherein each of said plurality of seating position means comprises,
   a pair of seating flanges extending up from each of said upper flanges along a length of said plurality of rails to releaseably engage each said twistlock pad against rotation,
   a height of said pair of seating flanges permitting each of said twistlock means to be lifted over said seating flanges and moved to said storage areas for retracted retention.

\* \* \* \* \*